United States Patent
Nagase

(10) Patent No.: US 9,557,013 B2
(45) Date of Patent: Jan. 31, 2017

(54) ILLUMINATION OPTICAL SYSTEM AND PROJECTION DISPLAY APPARATUS

(75) Inventor: Noriko Nagase, Tokyo (JP)

(73) Assignee: NEC DISPLAY SOLUTIONS, LTD., Tokyo (JP)

( * ) Notice: Subject to any disclaimer, the term of this patent is extended or adjusted under 35 U.S.C. 154(b) by 66 days.

(21) Appl. No.: 14/414,648

(22) PCT Filed: Aug. 1, 2012

(86) PCT No.: PCT/JP2012/069610
§ 371 (c)(1),
(2), (4) Date: Jan. 13, 2015

(87) PCT Pub. No.: WO2014/020728
PCT Pub. Date: Feb. 6, 2014

(65) Prior Publication Data
US 2015/0184810 A1     Jul. 2, 2015

(51) Int. Cl.
*G03B 21/20* (2006.01)
*H04N 9/31* (2006.01)
(Continued)

(52) U.S. Cl.
CPC ............. *F21K 9/50* (2013.01); *G03B 21/2013* (2013.01); *G03B 21/2033* (2013.01);
(Continued)

(58) Field of Classification Search
CPC ............ G03B 21/2013; G03B 21/2033; G03B 21/2066; G03B 33/12; H04N 9/3161; H04N 9/3164; F21K 9/50; G02B 27/141; G02B 27/1006
(Continued)

(56) References Cited

U.S. PATENT DOCUMENTS

2004/0263500 A1 * 12/2004 Sakata ................. H04N 9/3105
                                                         345/204

FOREIGN PATENT DOCUMENTS

CN          1501123 A      6/2004
CN        201097088 Y      8/2008
(Continued)

OTHER PUBLICATIONS

Japanese Office Action dated Oct. 20, 2015 with a partial English translation.
(Continued)

*Primary Examiner* — William C Dowling
*Assistant Examiner* — Ryan Howard
(74) *Attorney, Agent, or Firm* — McGinn IP Law Group, PLLC.

(57) ABSTRACT

Provided is an illumination optical system capable of emitting monochromatic light having high luminance while taking safety into consideration. The illumination optical system includes a first light source configured to emit monochromatic coherent light having a first peak wavelength that belongs to the wavelength region of visible light, a second light source configured to emit monochromatic incoherent light having a second peak wavelength that belongs to a wavelength region exhibiting the same color as that of the coherent light, and a dichroic mirror configured to mainly reflect one of the coherent light and the incoherent light while mainly transmitting the other, and synthesize the optical paths of the coherent light and the incoherent light.

20 Claims, 3 Drawing Sheets

(51) Int. Cl.
*F21K 99/00* (2016.01)
*G03B 33/12* (2006.01)

(52) U.S. Cl.
CPC ......... *G03B 21/2066* (2013.01); *G03B 33/12* (2013.01); *H04N 9/3161* (2013.01); *H04N 9/3164* (2013.01)

(58) Field of Classification Search
USPC .......................................................... 359/634
See application file for complete search history.

(56) References Cited

FOREIGN PATENT DOCUMENTS

| | | |
|---|---|---|
| CN | 102449550 A | 5/2012 |
| CN | 102483565 A | 5/2012 |
| JP | 2002-296680 A | 10/2002 |
| JP | 2005-091610 A | 4/2005 |
| JP | 2005-157221 A | 6/2005 |
| JP | 2005-250088 A | 9/2005 |
| JP | 2006-301114 A | 11/2006 |
| JP | 2006-301208 A | 11/2006 |
| JP | 2010-286521 A | 12/2010 |
| JP | 2011-505019 A | 2/2011 |
| JP | 2012-8549 A | 1/2012 |
| JP | 2012-073496 A | 4/2012 |
| JP | 2012-083522 A | 4/2012 |

OTHER PUBLICATIONS

Chinese Office Action dated Oct. 10, 2015 with an English translation.

International Search Report (ISR) (PCT Form PCT/ISA/210), in PCT/JP2012/069610, dated Sep. 11, 2012.

Chinese Office Action dated Apr. 20, 2016 with an English translation thereof.

* cited by examiner

ILLUMINATION OPTICAL SYSTEM AND PROJECTION DISPLAY APPARATUS

TECHNICAL FIELD

The present invention relates to an illumination optical system that includes a coherent light source and an incoherent light source, and a projection display apparatus that includes the illumination optical system.

BACKGROUND ART

At present, a mercury lamp is mainly used as a light source used for a projection display apparatus such as a projector. However, in order to prevent environmental pollution, there is a demand for development of mercury-free products. In order to address this situation, attention is now focused on a projector that uses a light-emitting diode (LED) or a laser diode (LD) not including any mercury (as discussed in JP2012-8549A). The LED or the LD is known as a light source configured to emit monochromatic light. In particular, a laser beam has high directivity, monochromaticity, and coherency, and thus can realize a projector having high luminance and high color reproducibility.

The "monochromatic color" is not limited to light having only a single wavelength, but includes light having a wavelength distribution of a level that enables a person to recognize a single color. In other words, in the Description, the "monochromatic color" includes light having a certain level of a wavelength distribution around a peak wavelength.

The laser beam is coherent light, and consequently direct viewing of the laser beam may harm a human body even if the laser output is low. This necessitates consideration being given to the safety of the human body. However, there is a trade-off relationship between safety and brightness. In other words, when the output of a laser light source is reduced, taking safety into consideration, brightness is reduced. Conversely, when brightness is increased, the output of the laser light source increases and this results in a decrease in safety.

Therefore, there is a desire that an illumination optical system capable of emitting monochromatic light having high luminance while taking safety into consideration be provided.

CITATION LIST

Patent Literature 1: JP2012-8549A

SUMMARY OF INVENTION

Solution to Problem

An illumination optical system according to an exemplary embodiment includes a first light source configured to emit monochromatic coherent light having a first peak wavelength that belongs to a wavelength region of visible light, a second light source configured to emit monochromatic incoherent light having a second peak wavelength that belongs to a wavelength region exhibiting the same color as that of the coherent light, and a dichroic mirror configured to mainly reflect the coherent light or the incoherent light while mainly transmitting the other, and to synthesize the optical paths of the coherent light and the incoherent light.

A projection display apparatus according to the present invention includes the above-mentioned illumination optical system.

In the illumination optical system of the above-mentioned configuration, synthesizing the coherent light and the incoherent light enables monochromatic light having light luminance to be realized even while preventing the output of the coherent light. As a result, the illumination optical system capable of emitting monochromatic light having high luminance while taking safety into consideration can be provided.

The above and other objects, features and advantages of the present invention will become apparent from the following description to be read in conjunction with the accompanying drawings.

DESCRIPTION OF EMBODIMENT

Hereinafter, the exemplary embodiments of the present invention will be described with reference to the drawings.

Figure 1:
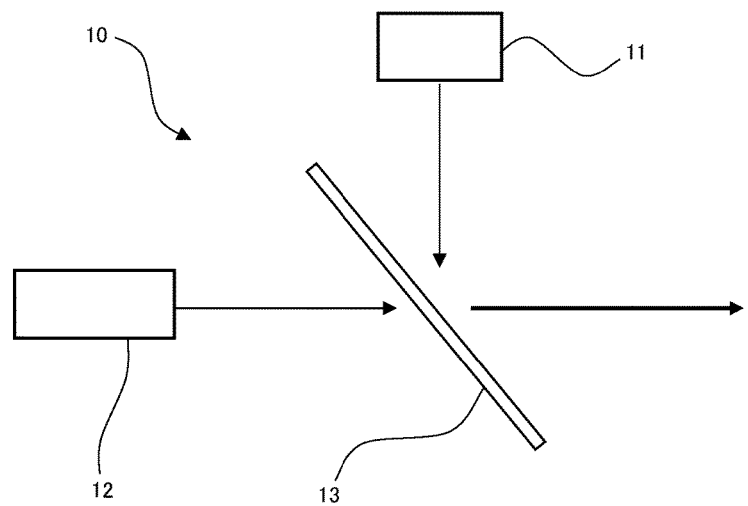
FIG. 1 is a diagram illustrating the schematic configuration of an illumination optical system according to the exemplary embodiment of the present invention.

FIG. 1 illustrates the schematic configuration of an illumination optical system according to the exemplary embodiment of the present invention. Illumination optical system 10 includes first light source 11, second light source 12, and dichroic mirror 13. First light source 11 is a polarized coherent light source. Second light source 12 is an unpolarized incoherent light source. First light source 11 may be, for example, a laser light source such as a laser diode. Second light source 12 may be, for example, a light-emitting diode (LED).

First light source 11 emits monochromatic coherent light having a first peak wavelength $\lambda 1$ that belongs to the wavelength region of visible light. This coherent light is polarized light. Second light source 12 emits monochromatic incoherent light having a second peak wavelength $\lambda 2$ that belongs to a wavelength region exhibiting the same color as that of the above-mentioned coherent light. This incoherent light is light that has not been polarized, in other words, unpolarized light. First light source 11 and second light source 12 emit lights that belong to the wavelength region of the same color.

First light source 11 and second light source 12 emit any one of, for example, light of a red wavelength region, light of a blue wavelength region, and light of a green wavelength region. The blue wavelength region has a range of 440 nm to 500 nm, the green wavelength region has a range of 500 nm to 580 nm, and the red wavelength region has a range of 580 nm to 750 nm.

First light source 11 and second light source 12 emit, for example, monochromatic light such as red light, blue light, or green light. The "monochromatic light" is not limited to light having only a single wavelength, but includes light having a wavelength distribution of a level that enables a person to recognize a single color. In other words, in the Description, the "monochromatic color" includes light having a wavelength distribution around a peak wavelength.

Dichroic mirror 13 synthesizes the coherent light, which is emitted from first light source 11, with the incoherent light that is emitted from second light source 12. In the example illustrated in FIG. 1, the coherent light that is emitted from first light source 11 is reflected by dichroic mirror 13. The incoherent light that is emitted from second light source 12 is transmitted through dichroic mirror 13. The coherent light that is reflected by dichroic mirror 13 and the incoherent light that is transmitted through dichroic mirror 13 are synthesized to advance in the same direction.

In the example illustrated in FIG. 1, dichroic mirror 13 mainly reflects the coherent light that is emitted from first light source 11 while mainly transmitting the incoherent light that is emitted from second light source 12. The incident angles of the coherent light and the incoherent light on dichroic mirror 13 are both 45 degrees.

The coherent light such as a laser beam may harm a human body even if the laser output is low. Illumination optical system 10 can emit monochromatic light having high luminance by synthesizing the coherent light and the incoherent light even if the output of light source 11 of the coherent light is small. Thus, the output of light source 11 can be reduced, taking safety of the human body into consideration, while maintaining the monochromatic light of high luminance.

Figure 2:
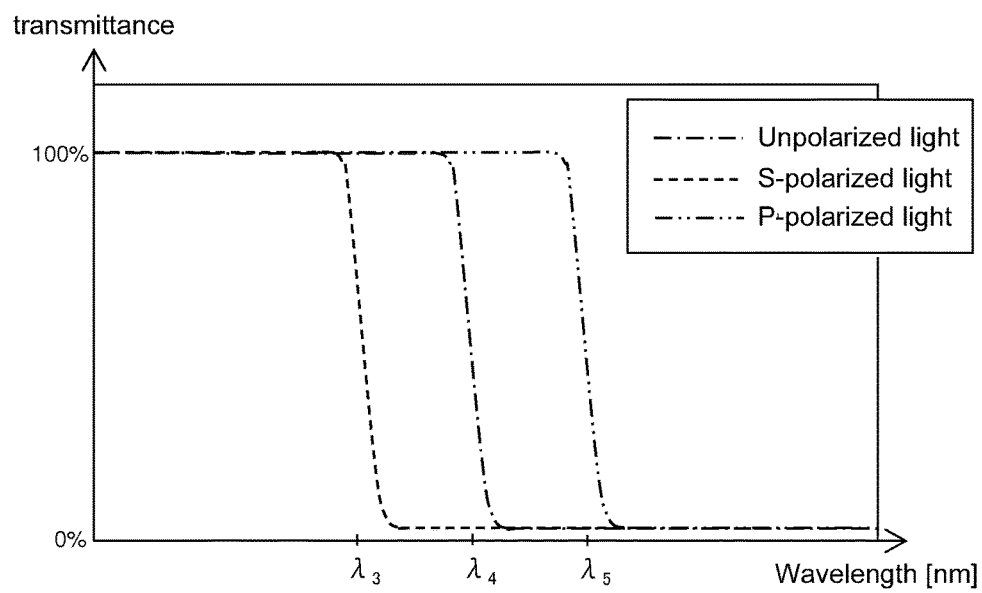
FIG. 2 is a graph illustrating an example of characteristics of a dichroic mirror illustrated in FIG. 1.

FIG. 2 illustrates the reflection/transmission characteristics of dichroic mirror 13. The dichroic mirror, which has characteristics illustrated in FIG. 2, mainly reflects S-polarized light having a wavelength longer than a wavelength $\lambda 3$ while mainly transmitting S-polarized light having a wavelength shorter than the wavelength $\lambda 3$. The dichroic mirror mainly reflects unpolarized light having a wavelength longer than a wavelength $\lambda 4$ while mainly transmitting unpolarized light having a wavelength shorter than the wavelength $\lambda 4$. The dichroic mirror mainly reflects P-polarized light having a wavelength longer than a wavelength $\lambda 5$ while mainly transmitting P-polarized light having a wavelength shorter than the wavelength $\lambda 5$. The wavelengths $\lambda 3$ to $\lambda 5$ are separation wavelengths having transmittance of 50%, and the relationship of $\lambda 3 < \lambda 4 < \lambda 5$ is set. In other words, the wavelength $\lambda 3$ is the shortest wavelength, while the wavelength $\lambda 5$ is the longest wavelength. In the exemplary embodiment, the S-polarized light or P-polarized light corresponds to the coherent light while the unpolarized light corresponds to the incoherent light.

Figure 3:
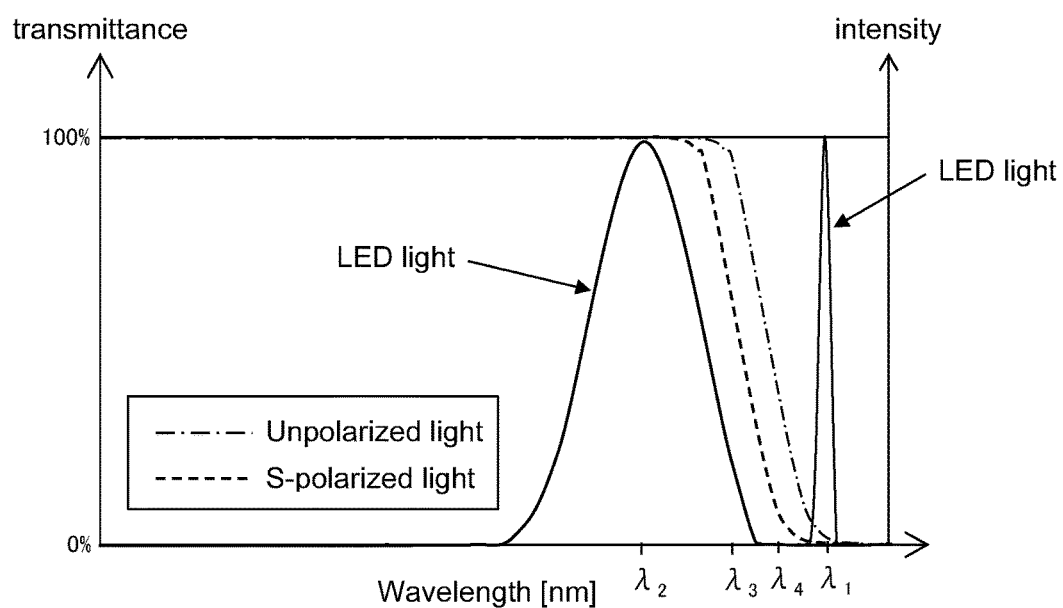
FIG. 3 is a graph illustrating an example of a relationship between the characteristics of the dichroic mirror and the intensity of light emitted from each light source.

FIG. 3 is a graph illustrating the example of a relationship between the characteristics of the dichroic mirror and the intensity of light that is emitted from each light source. The wavelength $\lambda 1$ of the coherent light, which is emitted from first light source (LD) 11, is longer than the wavelength $\lambda 2$ of the incoherent light that is emitted from second light source (LED) 12. The polarizing direction of the coherent light, which is emitted from first light source (LD) 11, may be S-polarized light with respect to the reflection surface of dichroic mirror 13. Dichroic mirror 13 has characteristics in which the separation wavelength $\lambda 3$ with respect to the S-polarized light (coherent light) is shorter than the separation wavelength $\lambda 4$ with respect to the unpolarized light (incoherent light). In this case, as illustrated in FIG. 3, it is preferred the relationships of "$\lambda 1 > \lambda 3$ and $\lambda 2 < \lambda 4$" be satisfied. Because of the relationship of "$\lambda 3 < \lambda 4$", the difference between $\lambda 1$ and $\lambda 2$ can be reduced more than that when the relationship of "$\lambda 3 = \lambda 4$" is satisfied. In other words, the peak wavelength $\lambda 2$ of the incoherent light, which is emitted from second light source (LED) 12, can be approximated to the peak wavelength $\lambda 1$ of the coherent light that is emitted from first light source (LD) 11.

Figure 4:
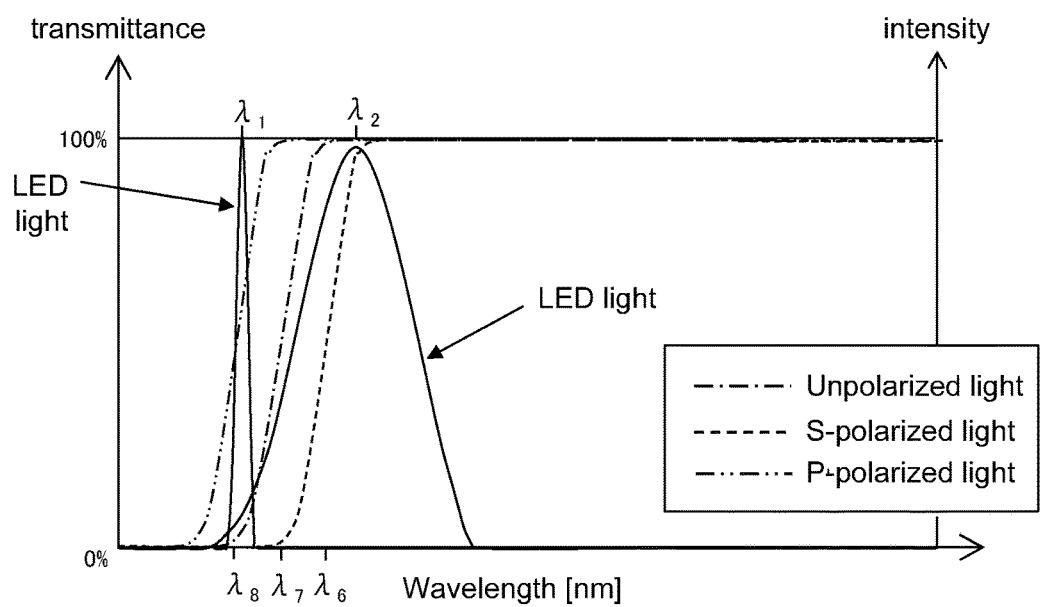
FIG. 4 is a graph illustrating another example of a relationship between the characteristics of the dichroic mirror and the intensity of light emitted from each light source.

FIG. 4 is a graph illustrating another example of a relationship between the characteristics of the dichroic mirror and the intensity of light that is emitted from each light source. The wavelength $\lambda 1$ of the coherent light, which is emitted from first light source (LD) 11, is shorter than the wavelength $\lambda 2$ of the incoherent light that is emitted from second light source (LED) 12. The dichroic mirror, which has characteristics illustrated in FIG. 4, mainly transmits S-polarized light having a wavelength longer than a wavelength $\lambda 6$ while mainly reflecting S-polarized light having a wavelength shorter than the wavelength $\lambda 6$. The dichroic mirror mainly transmits unpolarized light having a wavelength longer than a wavelength $\lambda 7$ while mainly reflecting unpolarized light having a wavelength shorter than the wavelength $\lambda 7$. The dichroic mirror mainly transmits P-polarized light having a wavelength longer than a wavelength $\lambda 8$ while mainly reflecting P-polarized light having a wavelength shorter than the wavelength $\lambda 8$. The wavelengths $\lambda 6$ to $\lambda 8$ are separation wavelengths that have transmittance of 50%, and the relationship of $\lambda 6 < \lambda 7 < \lambda 8$ is set. In other words, the wavelength $\lambda 6$ is the longest wavelength, while the wavelength $\lambda 8$ is the shortest wavelength.

The coherent light that is emitted from first light source (LD) 11 is S-polarized light. Dichroic mirror 13 has characteristics in which the separation wavelength $\lambda 6$ with respect to the S-polarized light (coherent light) is longer than the separation wavelength $\lambda 7$ with respect to the unpolarized light (incoherent light). In this case, as illustrated in FIG. 4, it is preferred the relationships of "$\lambda 1 < \lambda 6$ and $\lambda 2 > \lambda 7$" be satisfied. Because of the relationship of "$\lambda 6 > \lambda 7$", the difference between $\lambda 1$ and $\lambda 2$ can be reduced more than that when the relationship of "$\lambda 6 = \lambda 7$" is satisfied.

The case where the S-polarized coherent light is reflected by dichroic mirror 13, the unpolarized incoherent light is transmitted through dichroic mirror 13, and the two lights are synthesized, has been described. In this case, since the peak wavelengths of the coherent light and the incoherent light can be approximated to each other, the degradation of color purity can be prevented.

When first light source (LD) 11 is rotated by 90 degrees, P-polarized coherent light can be acquired. This P-polarized coherent light (wavelength $\lambda 1P$) can be synthesized with the unpolarized incoherent light (wavelength $\lambda 2$). In this case, it is preferred that the unpolarized incoherent light be reflected by the dichroic mirror while the P-polarized coherent light is transmitted through the dichroic mirror. Specifically, by using the dichroic mirror having the characteristics illustrated in FIGS. 2 and 3, only the relationships of "$\lambda 1P < \lambda 5$, $\lambda 2 > \lambda 4$, and $\lambda 1P > \lambda 2$" need to be satisfied. Thus, the peak wavelengths of the coherent light and the incoherent light can be approximated to each other.

Figure 5:
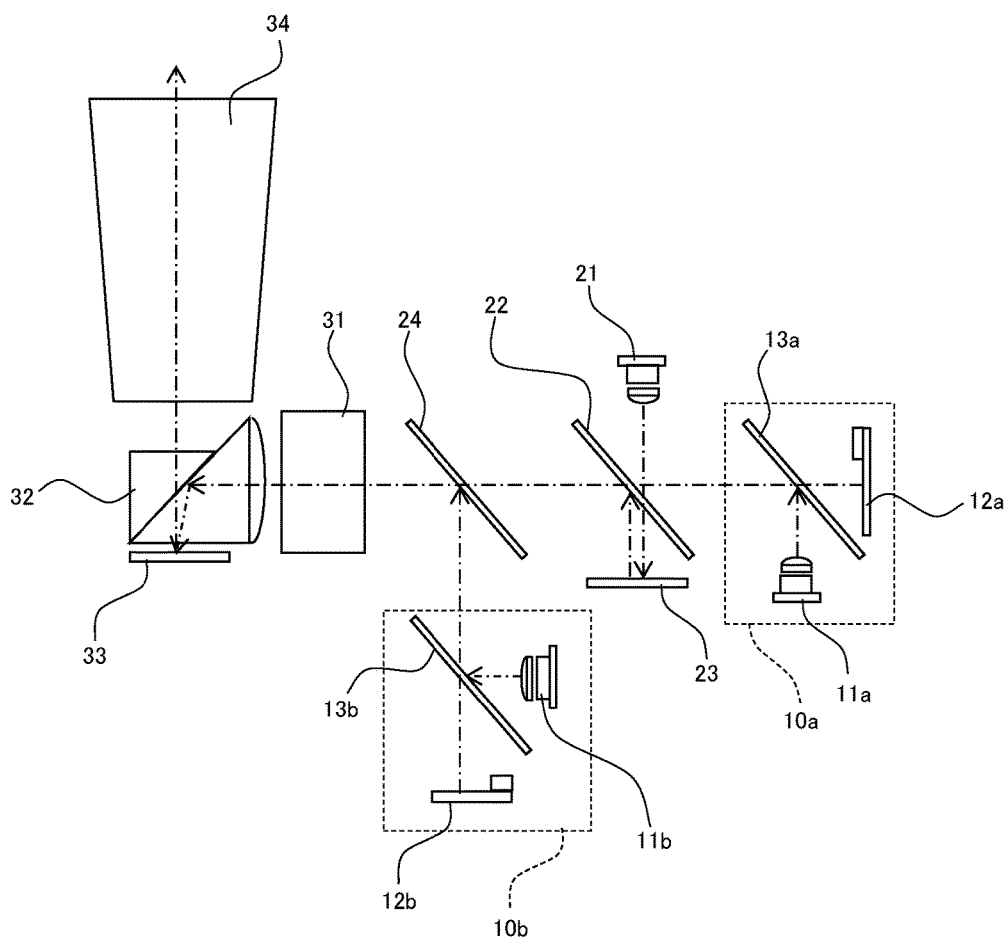
FIG. 5 is a schematic diagram illustrating the configuration of a projection display apparatus that includes the illumination optical system illustrated in FIG. 1.
Figure 6:
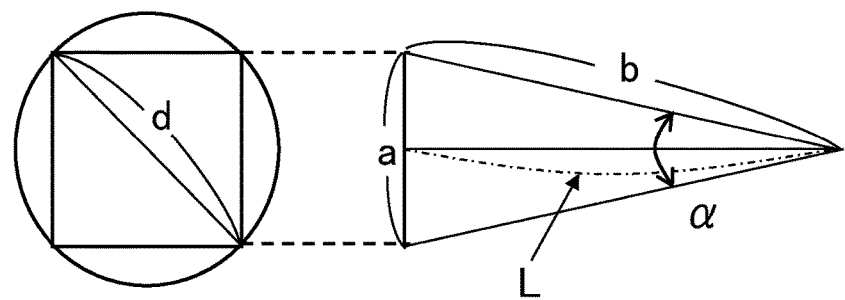
FIG. 6 is a schematic diagram illustrating a relationship between the pupil diameter and the visual angle of a projection lens.

Next, a projection display apparatus that includes the aforementioned illumination optical system will be described. FIG. 5 illustrates the configuration of a projector as a projection display apparatus according to an exemplary embodiment.

The projection display apparatus includes first illumination optical system 10a, second illumination optical system 10b, and third illumination optical systems 21 and 23. First illumination optical system 10a and second illumination optical system 10b are similar in configuration to the illumination optical system illustrated in FIG. 1.

First illumination optical system 10a includes first light source 11a, second light source 12a, and first dichroic mirror 13a. First light source 11a is a laser light source configured to emit monochromatic coherent light having a wavelength in a red region. Second light source 12a emits monochromatic incoherent light having a wavelength in the red region.

First dichroic mirror 13a synthesizes the coherent light, which is emitted from first light source 11a, with the incoherent light that is emitted from second light source 12a. Specifically, first dichroic mirror 13a may have characteristics illustrated in FIG. 3. In this case, the coherent light that is emitted from first light source 11a is S-polarized light.

Second illumination optical system 10b includes third light source 11b, fourth light source 12b, and second dichroic mirror 13b. Third light source 11b is a laser light source configured to emit coherent light having a wavelength in a blue region. Second light source 12b emits incoherent light having a wavelength in the blue region. Second dichroic mirror 13b synthesizes the coherent light, which is emitted from third light source 11b, with the incoherent light that is emitted from fourth light source 12b. In this case, the coherent light that is emitted from second light source 11b is S-polarized light.

Third illumination optical system 10c emits green light. The third illumination optical system 10c includes laser diode 21 configured to emit a blue laser beam, and green fluorescent body 23 configured to emit green fluorescent light when irradiated with light. Laser diode 21 is only required to emit light having a wavelength to excite green fluorescent body 23, and thus the light may be light (e.g., blue or ultraviolet light) having a wavelength shorter than that of the green light.

The blue laser beam that is emitted from laser diode 21 is transmitted through dichroic mirror 22 to be applied to green fluorescent body 23. Green fluorescent body 23 is accordingly excited to discharge green light having a wavelength corresponding to a green color.

The projection display apparatus includes synthetic optical systems 22 and 24 that are configured to synthesize the optical paths of the red light, the blue light, and the green light. The synthetic optical system includes dichroic mirrors 22 and 24. Dichroic mirror 22 has characteristics of transmitting the lights of red and blue wavelength regions while reflecting the light of a green wavelength region. Dichroic mirror 24 has characteristics of transmitting the lights of the red and green wavelength regions while reflecting the light of the blue wavelength region. The synthetic optical system is not limited to the specific configuration illustrated in FIG. 5, but only needs to be configured to synthesize the lights of the three colors.

Red synthesized light that is emitted from first illumination optical system 10a is transmitted through dichroic mirrors 22 and 24.

The green light that is discharged from fluorescent body 23 of the third illumination optical system is reflected by dichroic mirror 22. Accordingly, the green light is synthesized with the red light that is emitted from first illumination optical system 10a.

The synthesized light of the green light and the red light is transmitted through dichroic mirror 24. Blue synthesized light that is emitted from second illumination optical system 10b is reflected by dichroic mirror 24. Accordingly, the red light, the green light, and the blue light are synthesized.

The synthesized light of the three color lights is transmitted through lens group 31 to enter TIR prism 32. The synthesized light that is made incident on TIR prism 32 is reflected on the full reflection surface of TIR prism 32 to enter into reflective image element 33. As reflective image element 33, a digital mirror device (DMD) can be used.

The DMD is a semiconductor projection device that includes many micromirrors arrayed in a matrix. Each micromirror corresponds to the pixel of a projected image. Each micromirror is configured so that its mirror surface can be inclined around a twist axis at a predetermined angle, for example, ±12 degrees or ±10 degrees.

By driving an electrode located below each micromirror, each micromirror can be switched between an ON state (+12-degree inclination) and an OFF state (−12-degree inclination). Light, which is made incident on the micromirror in the ON state, is reflected toward projection lens 34 to be magnified and projected to a screen. Light, which is made incident on the micromirror in the OFF state, is reflected in a direction different from projection lens 34, and is not reflected to the screen. By switching each micromirror between the ON and OFF states at a high speed, the temporal ratio of the ON and OFF states is changed. Thus, the gradation of each pixel can be represented.

In order to project a color image to the screen, the lights of the respective colors are temporally separated to enter the DMD. In other words, to prevent temporal overlapping of the pulses of the respective colors, the pulses of the lights that are emitted from the first to third illumination optical systems are controlled. As an example, when the red light is projected, the micromirror is turned ON only at the instant when the red light comes into contact with the screen.

The light that is reflected on the micromirror in the ON state is transmitted through TIR prism 32, and passed through projection lens 34 to form an image. Thus, the color image is displayed on the screen.

First illumination optical system 10a, second illumination optical system 10b, and third illumination optical systems 21 and 23 emit the light pulses of the respective colors, for example, at a frequency of 240 Hz. The light pulses of different colors are not emitted simultaneously. In other words, a red pulse, a green pulse, and a blue pulse are temporally separated to be lit in order. As an example, the lighting sequence of the blue light can be 15%, and the lighting sequence of the red light can be 25%.

Hereinafter, laser safety in the aforementioned projection display apparatus will be described. The laser safety is defined in International Standard IEC 60825-1 established by International Electrotechnical Commission. According to this Standard, lasers are classified based on wavelengths or intensity. For each class, "accessible emission limit" that indicates a permissible maximum emission level is defined. A calculation formula for calculating an accessible emission limit is defined in detail according to the wavelength of a laser beam or exposure time. The classification is carried out based on the following three requirements. The value of an accessible emission limit of highest restriction among the three requirements is used.

Requirement 1

Exposure from any single pulse in pulse string should not exceed the accessible emission limit with respect to a single pulse;

Requirement 2

The accessible emission limit of the average power of a pulse string within emission continuance time T should not exceed the power corresponding to the accessible emission limit of a single pulse having time width of emission continuance time T Requirement 3

Energy per pulse should not exceed the accessible emission limit with respect to a single pulse multiplied by correction coefficient C5. However, the single pulse is multiplied by correction coefficient C5 only when pulse continuance time is less than 0.25 seconds.

Now, a class capable of securing safety, specifically, preventing damage to the retina, in the blink of a human eye, in other words, the time from viewing a laser beam to taking evasive action (about 0.25 seconds) will be discussed. The formulas for calculating the accessible emission limits in the requirements are finely classified based on the wavelength of a ray or the accessible emission time. When the wavelength of the laser beam is 400 to 700 nm, the accessible emission limits A1 to A3 of the requirements are respectively represented as follows:

$$A1 = 7 \times 10^{-4} \times t^{0.75} \times C6 \; [J] \quad \text{Requirement 1}$$

(wavelength λ=400 to 700 nm, t<0.25 [seconds])

$$A2 = C6 \times 10^{-3} \; [W] \quad \text{Requirement 2}$$

(wavelength λ=400 to 700 nm, t≥0.25 [seconds])

$$A3 = (\text{calculation result of requirement 1}) \times C5 \quad \text{Requirement 3}$$

C5 and C6 are correction coefficients, and t denotes emission continuance time (exposure time).

According to the exemplary embodiment, in order to calculate an accessible emission limit, first, the pulse width (time width) $tp_{blue}$ or $tp_{red}$ of each pulse of blue light or red light that is emitted from a blue laser light source or a red laser light source is calculated. Generally, the pulse width tp of a single pulse from each light source is represented as "tp=(1/frequency)×lighting sequence".

In the exemplary embodiment, it is assumed that the light sources are lit in sequence at the frequency=240 [Hz], the lighting sequence of the blue light is 15%, and the lighting sequence of the red light is 25%. Accordingly, the pulse widths $tp_{blue}$ and $tp_{red}$ of the pulses of the blue and red lights are calculated as follows.

$$tp_{blue} = (1/240 \; [Hz]) \times 0.15 = 0.625 \times 10^{-3} \; [\text{seconds}] \quad (1)$$

$$tp_{red} = (1/240 \; [Hz]) \times 0.25 = 1.04 \times 10^{-3} \; [\text{seconds}] \quad (2)$$

The values $tp_{blue}$ and $tp_{red}$ correspond to the emission continuance time in the requirement 1.

Then, the correction coefficient C6 is calculated. The correction coefficient C6 is calculated by the following formula:

$$C6 = \alpha / \alpha_{min} \quad (3)$$

"α" is a visual angle, in other words, an angle formed between two straight lines from both ends of an object to be projected to an eye, and $\alpha_{min}$ is a generally possible minimum visual angle. In the smallest diaphragmmed state, the size of an image on an eyeball retina is 25 to 30 [µm], and the focal distance of an eyeball is 17 [mm]. The minimum visual angle when calculated by using these numerical values is $\alpha_{min} \approx 1.5$.

As illustrated in FIG. 7, a visual angle α at a position away by L=100 [mm] from a pupil is calculated. From FIG. 7, the following relational formula is derived:

$$\cos(\alpha/2) = L/b \quad (4)$$

"b" is represented by the following formula using the length "a" in the drawing:

$$b = ((a/2)^2 + L^2)^{1/2} \quad (5)$$

The length "a" is represented by the following formula using the pupil diameter "d" of the projection lens:

$$a = d/2^{1/2} \quad (6)$$

Accordingly, the vial angle α is calculated by the following formula using the pupil diameter d and L from the above-mentioned formulas (4) to (6):

$$\alpha = 2 \times \cos^{-1}(L/(d^2/8 + L^2)^{1/2}) \quad (7)$$

The pupil diameter d of the projection lens according to the exemplary embodiment is 2.3 [mm] with respect to the blue light (i.e., $d_{blue}$=2.3 [mm]), and is 2.2 [mm] with respect to the red light (i.e., $d_{red}$=2.2 [mm]) The pupil diameter of the lens is an actually measured value, and thus slightly varies from one color (wavelength) of a laser beam to another. When the above-mentioned formula is substituted for the pupil diameter of the lens with respect to each light and the length L (=100 [mm]), visual angles $\alpha_{blue}$ and $\alpha_{red}$, are with respect to the respective lights, are calculated as follows:

$$\alpha_{blue} \approx 23.8 \; [\text{mrad}] \quad (8)$$

$$\alpha_{red} \approx 22.0 \; [\text{mrad}] \quad (9)$$

By substituting the above-mentioned formula for these visual angle values and the value $\alpha_{min}$=1.5, correction coefficients $C6_{blue}$ and $C6_{red}$, with respect to the laser beams of the respective colors, are calculated as follows:

$$C6_{blue} = 15.9 \quad (10)$$

$$C6_{red} = 14.7 \quad (11)$$

Then, the correction coefficient C5 is calculated. The correction coefficient C5 is calculated by the following formula.

$$C5 = N^{-0.25}$$

N is the number of pulses that are emitted within the emission continuance time. In the exemplary embodiment, taking into a consideration a range where safety, specifically, preventing damage to the retina in the blink of a human eye (0.25 [sec]), is secured, all possible emission continuance time is 0.25 [sec]. Thus, the number N of pulses of the laser beam of each color within the emission continuance time is represented as follows:

$$N = 0.25 \; [\text{sec}] \times 240 \; [Hz] = 60 \quad (12)$$

Accordingly, the correction coefficient C5 is represented as follows:

$$C5 = 60^{-0.25} \quad (13)$$

When the value of the correction coefficient C6 and the value of the $tp_{blue}$ of the formula (1) are used, the accessible emission limit $A1_{blue}$ of the requirement 1 with respect to the blue laser beam is represented as follows:

$$A1_{blue} = 7 \times 10^{-4} \times tp_{blue}^{0.75} \times C6_{blue} \; [J] = 43.90 \times 10^{-6} \; [J]$$

When the accessible emission limit $Al_{blue}$ is divided by the exposure time $tp_{blue}$=0.625×10$^{-3}$ [sec] to be unit-converted, the result is 70.23 [mW].

When the value of the correction coefficient C6 is used, the accessible emission limit $A2_{blue}$ of requirement 2 with respect to the blue laser beam is represented as follows:

$$A2 = C6 \times 10^{-3} \times [W] = 15.9 \times 10^{-3} \; [W]$$

The value of A2 indicates emission power based on a time standard (T=0.25 [sec]). When the accessible emission limit $A1_{blue}$ is multiplied by T=0.25 [sec] to be unit-converted, the result is 3.975 [J]. This value is divided by the number N of pulses in order to acquire energy per pulse, and is divided by the exposure time tp of one pulse to be unit-converted, and the result is 105.23 [mW].

When the accessible emission limit $A3_{blue}$ of the requirement 3 is unit-converted as well as the case of $A1_{blue}$, the result is 25.23 [mW]. Thus, among the three requirements, the strictest requirement is the third one.

Concerning the red laser beam, when unit conversion is carried out for respective requirements 1 to 3 in the same way as described above, values 57.22 [mW], 58.9 [mW], and 20.6 [mW] are respectively calculated for the requirements 1 to 3. Thus, for the red laser beam, the requirement of strictest restriction is similar the requirement 3.

According to the above-mentioned calculation, the accessible emission limit of each color laser beam is 25.23 [mW], and the accessible emission limit of the red laser beam is 25.23 [mW]. This value is an emission limit value of a range within which no damage to the human retina will occur during the human blinking time of 0.25 [sec] immediately after the laser beam exits projection lens 34. The acquired accessible emission limit is a value enabling entry into the opening of a human pupil diameter ϕ7 [mm]. This value is converted into an accessible emission limit value in an area through which light can be transmitted immediately after the light exits from projection lens 34. In the exemplary embodiment, the light transmission area of projection lens 34 is 274.3 [mm2]. Thus, an accessible emission limit immediately after the light exits from the projection lens is acquired as a value obtained by multiplying the above-mentioned value by "projection lens transmission area/ϕ7 opening area". In other words, an accessible emission limit immediately after light exits from the projection lens is 179.75 [mW] for the blue laser beam, and an accessible emission limit immediately after light exits from the projection lens is 144.63 [mW] for the red laser beam.

In the aforementioned projection display apparatus, even when a white color is displayed on the screen, the first to third illumination optical systems are not simultaneously lit. As a result, the accessible emission limit of the projection display apparatus is similar to that of the illumination optical system corresponding to each color.

Visibility at the peak wavelength of the red laser beam, which is emitted from actually used first light source (LD) 11a, is 109.2 [lm/W]. Visibility at the peak wavelength of the blue laser beam, which is emitted from third light source (LD) 11b, is 32.8 [lm/W]. When these values are used, the brightness limit of the blue light immediately after the blue lights exits from projection lens 34 is 5.90 [lm], and the brightness limit of the red light immediately after the red light exits from projection lens 34 is 15.8 [lm].

The above-mentioned calculation of the accessible emission limit is carried out in a case where only coherent light source is present without taking any inherent light source into consideration. Brightness at the accessible emission limit is calculated in a case where the illumination optical system calculates a laser light source and a LED light source. As a blue LED (fourth light source 12b), a light source that emits light of 20 [lm] when driven with 15% of lighting time is used. Since the light use efficiency of the projection display apparatus is 30%, light from the blue LED is 6 [lm] when blue light exits from projection lens 34. When the light from laser light source (third light source) 11b, namely, light of 5.90 [lm], and the light from the blue LED are synthesized, the result is synthesized light of 11.9 [lm]. Thus, brightness at the emission limit is about double. In the case of emitting the light of 11.9 [lm] only from laser light source 11b, when the visibility 32.8 [lm/W] of laser light source 11b is taken into consideration, the power of laser light source 11b is 362 [mW]. This power greatly exceeds the range where safety, specifically, preventing damage to the retina in the blinking time of 0.25 [sec], is assured, and direct viewing of a beam harbors a potential danger.

Calculation is carried out for the red color on similar conditions. As a red LED (second light source 12a), a light source that emits light of 20 [lm] when driven with 25% of lighting time is used. Since light use efficiency is 25%, light from the red LED is 5 [lm] when the red light exits from projection lens 34. When the light from laser light source (first light source) 11a, namely, light of 15.8 [lm], and the light from the red LED are synthesized, the result is synthesized light of 20.8 [lm]. Thus, brightness at the emission limit is larger by about 1.3. In the case of emitting the light of 20.8 [lm] only from laser light source 11a, when calculation is carried by using the visibility 109.2 [lm/W] of red laser light source (LD) 11a, the power of red laser light source 11a is 190 [mW]. This power greatly exceeds the range where safety, specifically, preventing damage to the retina in the blinking time of 0.25 [sec], is assured, and direct viewing of a beam harbors a potential danger.

Thus, by combining the coherent light source (laser light source) and the incoherent light source, brightness can be improved while assuring safety.

In the example illustrated in FIG. 5, each of first illumination optical system 10a that emits the red light of the red wavelength region and second illumination optical system 10b that emits the blue light of the blue wavelength region has the configuration illustrated in FIG. 1. However, according to the present invention, at least one of the first illumination optical system that emits the red light of the red wavelength region, the second illumination optical system that emits the blue light of the blue wavelength region, and the third illumination optical system that emits the green light of the green wavelength region needs to have the configuration illustrated in FIG. 1.

The preferred exemplary embodiments of the present invention have been described in detail. However, the present invention is not limited to the exemplary embodiments. Various changes and modifications can be made without departing from the gist of the present invention.

REFERENCE NUMERALS 10, 10a, 10 Illumination optical system
11, 11a First light source
12, 12a Second light source
11b Third light source
12b Fourth light source
13, 13a, 13b Dichroic mirror
21 Laser diode
22, 24 Dichroic mirror
23 Fluorescent body
31 Lens group
32 TIR prism
33 Reflective image element
34 Projection lens

The invention claimed is:
1. An illumination optical system, comprising:
a first light source configured to emit coherent light having a first peak wavelength that belongs to a wavelength region of visible light;
a second light source configured to emit incoherent light having a second peak wavelength that belongs to a wavelength region of visible light; and a dichroic mirror configured to mainly reflect one of the coherent light and the incoherent light while mainly transmitting another one of the coherent light and the incoherent light, and synthesize optical paths of the coherent light and the incoherent light, wherein the dichroic mirror has characteristics in which a first separation wavelength having transmittance of 50% with respect to S-polarized light is smaller than a second separation wavelength having transmittance of 50% with respect to unpolarized light, wherein the first peak wavelength is larger than the first separation wavelength, and wherein the second peak wavelength is smaller than the second separation wavelength.

2. The illumination optical system according to claim 1, wherein the dichroic mirror mainly reflects the coherent light, and the coherent light comprises the S-polarized light with respect to the dichroic mirror.

3. The illumination optical system according to claim 1, wherein the coherent light source comprises a laser light source.

4. A projection display apparatus comprising the illumination optical system specified in claim 1.

5. The illumination optical system according to claim 1, wherein the second peak wavelength belongs to a wavelength region exhibiting a same color as that of the coherent light.

6. The illumination optical system according to claim 1, wherein the dichroic mirror mainly reflects the coherent light.

7. The illumination optical system according to claim 1, wherein the coherent light comprises the S-polarized light with respect to the dichroic mirror.

8. An illumination optical system, comprising:
   a first light source configured to emit coherent light having a first peak wavelength that belongs to a wavelength region of visible light;
   a second light source configured to emit incoherent light having a second peak wavelength that belongs to a wavelength region of visible light; and
   a dichroic mirror configured to mainly reflect one of the coherent light and the incoherent light while mainly transmitting another one of the coherent light and the incoherent light, and synthesize optical paths of the coherent light and the incoherent light,
   wherein the dichroic mirror has characteristics in which a first separation wavelength having transmittance of 50% with respect to S-polarized light is larger than a second separation wavelength having transmittance of 50% with respect to unpolarized light;
   wherein the first peak wavelength is smaller than the first separation wavelength, and
   wherein the second peak wavelength is larger than the second separation wavelength.

9. A projection display apparatus comprising the illumination optical system specified in claim 8.

10. An illumination optical system, comprising:
   a first illumination optical system configured to emit red light of a red wavelength region;
   a second illumination optical system configured to emit blue light of a blue wavelength region; and
   a third illumination optical system configured to emit green light of a green wavelength region,
   wherein at least one of the first to third illumination optical systems includes:
   a first light source configured to emit coherent light having a first peak wavelength that belongs to a wavelength region of visible light;
   a second light source configured to emit incoherent light having a second peak wavelength that belong to a wavelength region of visible light; and
   a dichroic mirror configured to mainly reflect one of the coherent light and the incoherent light while mainly transmitting another one of the coherent light and the incoherent light, and synthesize optical paths of the coherent light and the incoherent light,
   wherein the dichroic mirror has characteristics in which a first separation wavelength having transmittance of 50% with respect to S-polarized light is smaller than a second separation wavelength having transmittance of 50% with respect to unpolarized light,
   wherein the first peak wavelength is larger than the first separation wavelength, and
   wherein the second peak wavelength is smaller than the second separation wavelength.

11. The illumination optical system according to claim 10, wherein the first to third illumination optical systems respectively emit the red light, the blue light, and the green light so as to prevent temporal overlapping of pulses of the red light, the blue light, and the green light.

12. The illumination optical system according to claim 10, further comprising a synthetic optical system configured to synthesize optical paths of the red light, the blue light, and the green light.

13. A projection display apparatus comprising the illumination optical system specified in claim 10.

14. The illumination optical system according to claim 10, wherein the dichroic mirror mainly reflects the coherent light.

15. The illumination optical system according to claim 14, wherein the coherent light comprises the S-polarized light with respect to the dichroic mirror.

16. The illumination optical system according to claim 10, wherein the coherent light comprises the S-polarized light with respect to the dichroic mirror.

17. The illumination optical system according to claim 10, wherein the coherent light source comprises a laser light source.

18. The illumination optical system according to claim 10, wherein the second peak wavelength belongs to a wavelength region exhibiting a same color as that of the coherent light.

19. An illumination optical system, comprising:
   a first illumination optical system configured to emit red light of a red wavelength region;
   a second illumination optical system configured to emit blue light of a blue wavelength region; and
   a third illumination optical system configured to emit green light of a green wavelength region,
   wherein at least one of the first to third illumination optical system includes:
   a first light source configured to emit coherent light having a first peak wavelength that belongs to a wavelength region of visible light;
   a second light source configured to emit incoherent light having a second peak wavelength that belongs to a wavelength region of visible light; and
   a dichroic mirror configured to mainly reflect one of the coherent light and the incoherent light while mainly transmitting another one of the coherent light and the incoherent light, and synthesize optical paths of the coherent light and the incoherent light, wherein the dichroic mirror has characteristics in which a first separation wavelength having transmittance of 50% with respect to S-polarized the light is larger than a second separation wavelength having transmittance of 50% with respect to unpolarized light, wherein the first peak wavelength is smaller than the first separation wavelength, and wherein the second peak wavelength is larger than the second separation wavelength.

20. A projection display apparatus comprising the illumination optical system specified in claim 19.

* * * * *